April 18, 1967     F. W. HOCHMUTH     3,314,231
STEAMING FEEDWATER SYSTEM UTILIZING GAS TURBINE EXHAUST
Filed Dec. 29, 1965
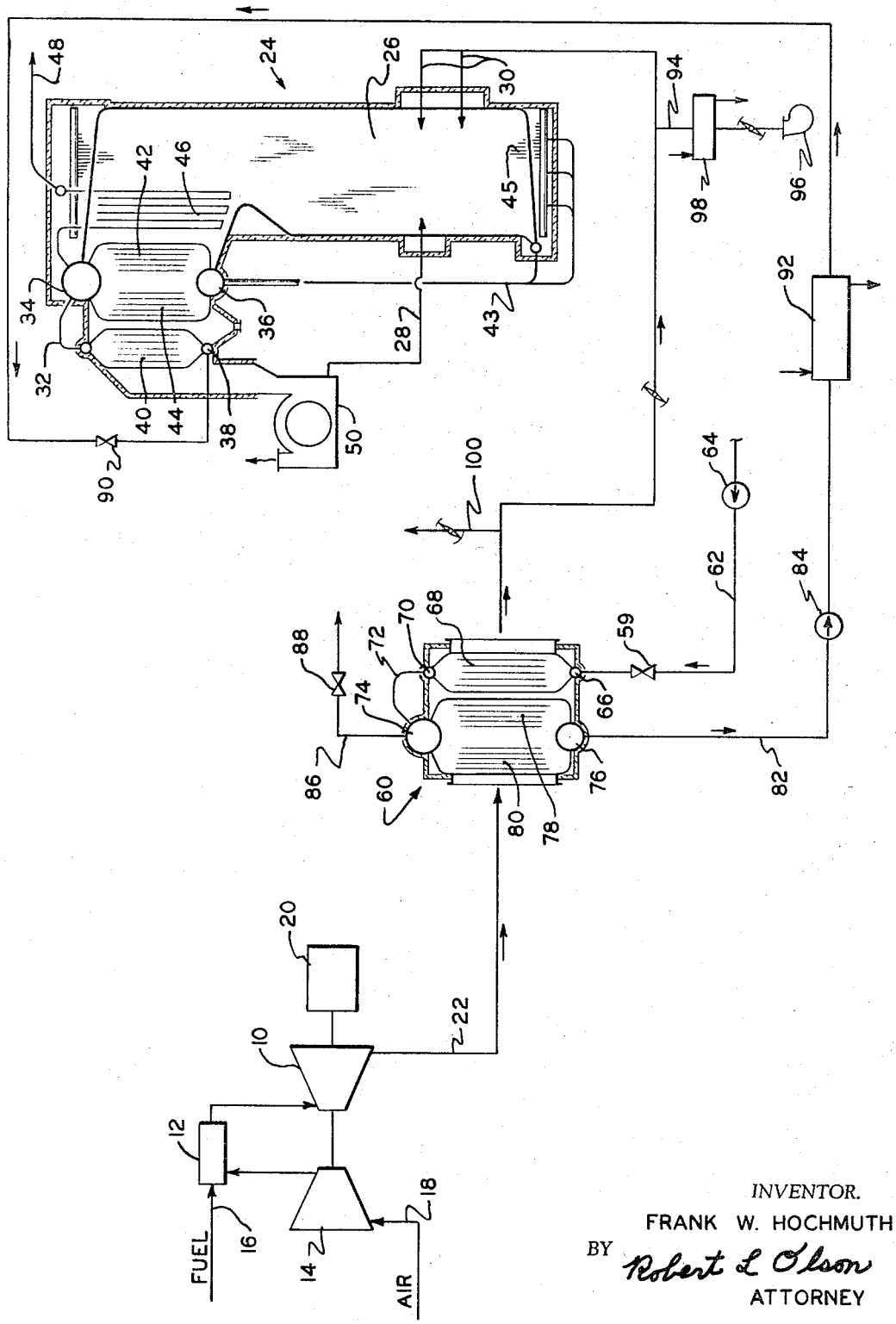
INVENTOR.
FRANK W. HOCHMUTH
BY *Robert L Olson*
ATTORNEY

United States Patent Office 3,314,231
Patented Apr. 18, 1967

3,314,231
STEAMING FEEDWATER SYSTEM UTILIZING GAS TURBINE EXHAUST
Frank W. Hochmuth, West Simsbury, Conn., assignor to Combustion Engineering, Inc., Windsor, Conn., a corporation of Delaware
Filed Dec. 29, 1965, Ser. No. 517,210
3 Claims. (Cl. 60—39.18)

This invention relates to a power plant whereby the hot exhaust gases from a gas turbine are utilized in conjunction with two steam generators.

When a gas turbine is installed adjacent to one or more direct fired steam generators, the thermal efficiency of the combined operation can be improved if a means is provided for utilizing the heat contained in the gas turbine exhaust. This invention provides a power plant arrangement including a gas turbine and two steam generators arranged in such a manner that the heat contained in the gas turbine exhaust gases are always efficiently used, without decreasing the efficiency of the steam generating equipment.

It is an object of this invention to provide a power plant wherein the exhaust gases of a gas turbine pass through a first waste heat steam generator, and then flow on to a second steam generator to act as the combustion supporting medium for the fuel being burned therein. It is a further object to provide such a system wherein the combustion supporting medium and the feedwater, which is being supplied to the second steam generator, is always at substantially the same temperature, regardless of whether or not the gas turbine is in operation, thus enabling the second stem generator to continuously operate at top efficiency.

The invention will be described with reference to the accompanying drawing, wherein the figure is a diagrammatic view of a power plant including a gas turbine and two steam generators, incorporating my invention.

Looking now to the drawing, 10 designates a gas turbine which is supplied with hot gases from combustion chamber 12. Air enters compressor 14 through inlet line 18 and passes on to the combustion chamber 12, along with fuel flowing through line 16, and the combustion products then pass through turbine 10. The turbine 10 drives a generator 20, and also the air compressor.

The hot exhaust gas leaving the gas turbine 10 flows through duct 22 into a waste heat steam generator 60, and after giving up a substantial portion of its residual heat therein, flows on to the furnace 26 of chemical recovery unit 24. Black liquor fuel is supplied to the furnace through line 28, and the oxygen contained in the gas turbine exhaust gas entering through ducts 30 acts as the combustion supporting medium for the black liquor.

Chemical recovery unit 24 includes a boiler section 32, which consists of an upper drum 34, a lower drum 36, and rows of downcomer tubes 44 and riser tubes 42 extending therebetween.

Boiler 32 is supplied with water from economizer 40, the water entering the economizer tubes through inlet header 38. Water flows from drum 34 to drum 36 by means of downcomers 44 thereby picking up heat from the hot gases, and a steam and water mixture flows back to the steam release drum 34 by way of risers 42. The flow through this circuit is caused by natural circulation, the water in downcomer tubes 44 being of a greater density than the steam and water mixture contained in riser tubes 42. Water also leaves lower drum 36 by way of pipe 43 and enters water wall tubes 45 which completely line the four walls of the furnace 26. The water leaving tubes 45 flows into upper drum 34.

The steam entering upper drum 34 is separated from the water and flows to superheater section 46, and from there passes on to a steam turbine (not shown) through line 48.

The combustion gases after giving up heat to the economizer, steam generating section, and superheater, passes on to a direct contact evaporator 50 where the temperature of such gases is reduced to a point where they can be economically vented to the atmosphere, for example 300° F. The heat absorbed in the evaporator is used to evaporate moisture from the black liquor which is the fuel burned in furnace 26.

The second steam generator 60 of the power plant is located in the exhaust duct 22 leading from the gas turbine. No fuel is burned in this waste heat steam generator, and its only heat source is the hot gases leaving the gas turbine.

Feedwater, at approximately 250° F. and 140 p.s.i., is supplied to lower header 66 of economizer 68 through inlet line 62 by feedwater pump 64. Valve 59 in line 62 maintains a constant water level within boiler 60. The water leaves the economizer section through header 70, and flows through line 72 into upper drum 74 of the boiler section. Water flows downwardly from the upper drum 74 into lower drum 76, through downcomers 78, and flows upwardly through riser tubes 80.

During normal operation of the power plant, when both the gas turbine and the primary steam generator 24 are being used, heated water, at approximately 360° F. flows through line 82 from lower drum 76 to the inlet header 38 of steam generator 24. A booster feed pump 84 positioned in line 82 increases the pressure of the water, causing it to flow to the primary steam generator. A typical chemical recovery unit will operate in the range of 300–1250 p.s.i.

In the event the steam generator 24 is operative when the gas turbine 10 is not, a steam heater 92 is located in line 82 to bring the hot water up to temperature. Once a steam generator has been designed and built to operate at given temperatures and pressures, they are capable of operating at their highest efficiency only when the right amount of fuel, air and water is supplied to it at set temperatures and pressures. The steam for steam heater 92 can come from any suitable source, for example the steam generator 24.

When the gas turbine is not operating and steam generator 24 is, air is supplied to the furnace 26 through duct 94 by means of forced draft fan 96. The air is heated by a steam air heater 98, so as to supply the air at approximately the same temperature as the gas turbine exhaust gas that normally flows to the furnace. The gases leaving gas turbine 10 may be on the order of 830° F., and after flowing through steam generator 60, enter the furnace at approximately 350° F.

When the gas turbine is operating while the primary steam generator 24 is not, the secondary steam generator 60 can be utilized to supply low pressure steam through line 86. This low pressure steam can normally be put to use in a number of ways, particularly in a pulp paper making plant. Valve 90 is provided in water line 82, and valve 88 is positioned in steam line 86, so that the desired flow of both can be achieved. Valve 90 would be closed when the primary steam generator 24 is not in operation, and valve 88 would be open. These valves would be reversed during operation of generator 24. Vent line 100 is connected to gas turbine exhaust duct 22 downstream of secondary steam generator 60, so that when the gas turbine is operative when steam generator 24 is not, the gases leaving steam generator 60 can be vented to atmosphere.

From the above it can be seen that a power plant has been provided which is capable of operating at high efficiency at all times. Having thus described my invention, what I claim is:

1. A power plant comprising a first steam generator, a furnace associated with said first steam generator in which fuel is burned, said first steam generator including an economizer section, and a steam generating section, a gas turbine having a fuel and air inlet, and an exhaust gas outlet, a first duct extending from said gas turbine outlet to a region of combustion within the furnace, whereby the oxygen contained in the gas turbine exhaust gases supports combustion of the fuel within the furnace, a second steam generator, located within the first duct, said second steam generator including an upper drum, a lower drum, riser and downcomer tubes extending between said upper and lower drums, an inlet line for supplying liquid to the second steam generator, a first valved outlet line connecting the lower drum to the economizer of the first steam generator, a pump contained in the first valved outlet line for increasing the pressure in the first outlet line to a point where liquid will flow to the economizer of the first steam generator, a second valved outlet line leading from the upper portion of the upper drum, through which relatively low pressure steam generated in the second steam generator can be discharged.

2. The combination set forth in claim 1, whereby the first valved outlet line contains a steam heater therein.

3. The combination set forth in claim 1, including a second duct, the inlet of which is open to atmosphere and the outlet of which is connected to the region of combustion within the furnace of the first generator, and a steam air heater located within the second duct.

References Cited by the Examiner
UNITED STATES PATENTS

| | | | |
|---|---|---|---|
| 2,372,992 | 4/1945 | Wallis et al. | 122—7 |
| 2,620,780 | 12/1952 | Marquez | 122—7 |
| 3,118,429 | 1/1964 | Hockmuth | 122—7 |

KENNETH W. SPRAGUE, *Primary Examiner.*